United States Patent [19]

Rappaport et al.

[11] Patent Number: 4,727,599

[45] Date of Patent: Feb. 23, 1988

[54] WATERPROOF RADIO HEADBAND

[76] Inventors: Richard M. Rappaport, 4860 W. 39 St. 117, St. Louis Pk., Minn. 55416; Scott Bean, 2600 14th Ave. S., Minneapolis, Minn. 55407

[21] Appl. No.: 782,958

[22] Filed: Oct. 2, 1985

[51] Int. Cl.[4] ........................ H04B 1/08

[52] U.S. Cl. ........................ 455/351; 455/347; 455/352; 2/DIG. 11; 379/430; 381/187

[58] Field of Search ........................ 455/89, 90, 100, 347, 455/351, 352; 128/380, 388, 389, 706, 707; 446/26, 27; 272/DIG. 5; 2/171.2, DIG. 11; 235/105; 381/183, 187; 379/430

[56] References Cited

U.S. PATENT DOCUMENTS

| | | | |
|---|---|---|---|
| 3,134,861 | 5/1964 | Dempsey et al. . | |
| 3,254,444 | 6/1966 | Paterson | 455/351 |
| 3,863,626 | 2/1975 | Huber | 128/706 |
| 3,983,483 | 9/1976 | Pando | 455/100 |
| 4,050,493 | 9/1977 | Cho . | |
| 4,130,803 | 12/1978 | Thompson . | |
| 4,312,358 | 1/1982 | Barney | 128/708 |
| 4,321,433 | 3/1982 | King | 455/351 |
| 4,340,972 | 7/1982 | Heist | 455/39 |
| 4,456,797 | 6/1984 | Olsen . | |

FOREIGN PATENT DOCUMENTS

| | | | |
|---|---|---|---|
| 3419296 | 11/1985 | Fed. Rep. of Germany | 128/690 |

*Primary Examiner*—Jin F. Ng
*Assistant Examiner*—Elissa Seidenglanz
*Attorney, Agent, or Firm*—Merchant, Gould, Smith, Edell, Welter & Schmidt

[57] ABSTRACT

The present invention provides an elastomeric headband containing an amplifier device such as stereophonic radio or a recording amplifier. The headband includes earphones which overlie the user's ears. The elastomeric band is suitably sized to be readily mounted and dismounted from the user's head. The headband may be floatable in water.

10 Claims, 3 Drawing Figures

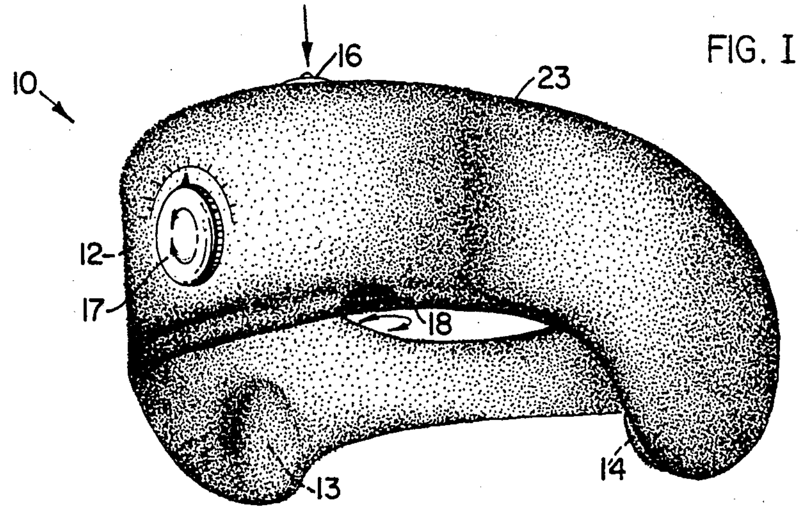
FIG. I
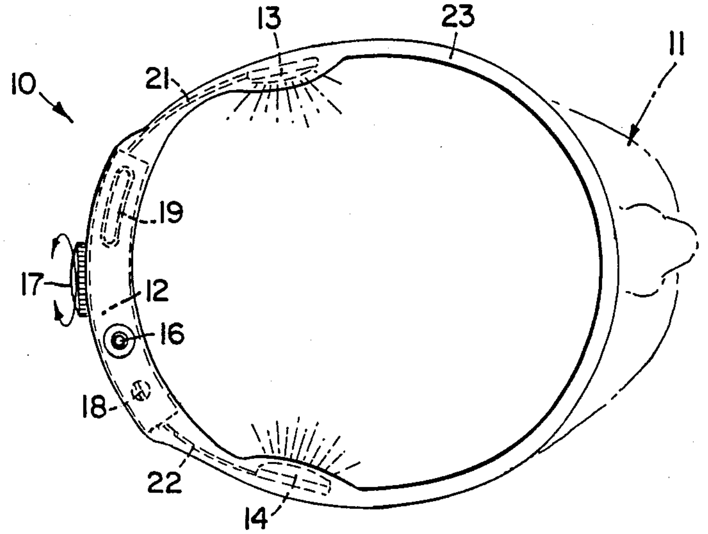
FIG. II
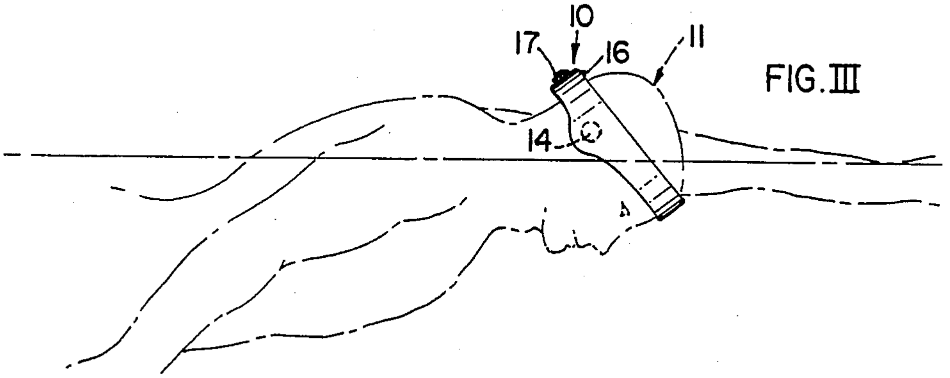
FIG. III

WATERPROOF RADIO HEADBAND

TECHNICAL FIELD OF THE INVENTION

The present invention relates to personal amplifier equipment and more particularly to an inflatable self contained headband which includes an amplifier unit and earphones.

BACKGROUND OF THE INVENTION

Personal radio receiving equipment has been known for several years and has become very popular for joggers, walkers and the like. While the previous walkabout radios have very adequately served the purpose of the individual involved in such sports as jogging, walking, cycling and the like, the previous walkabout radios are generally not suitable for use in a water environment such as swimming, surfing, water skiing and the like.

At least one attempt has been made in the past to adapt the walkabout type radio for use in a water environment. U.S. Pat. No. 4,456,797 (Olsen) shows such a device. The Olsen stereo system includes a belt and sealed envelope which may be worn about the user's waist. A retractable cord then extends to a pair of earphones which are worn on the user's head. While such a device may serve the purpose, it is cumbersome. The loose wire and device about the waist may be impediments to swimming, surfing, and other activities where there is a significant movement between the user and the water surface.

GENERAL DESCRIPTION OF THE INVENTION

The present device is a radio receiver or cassette player system in which all the components including the circuit boards, wiring, earphones, and antenna are enclosed within a sealed water-tight headband. The present invention does not have loose wires or bulky units that hang about the body. The present device permits use in a wide variety of sports such as swimming, sail boating, surfing and wind surfing, as well as walking and the like. The headband may be made of any suitable elastomeric material and seals the various components including the earphones, receiver or cassette player from the external environment. Desirably, the present device floats in water.

BRIEF DESCRIPTION OF THE DRAWINGS

FIG. 1 is a perspective view of the device of the present invention;

FIG. 2 is a top plan view showing the location of the various elements of the present invention;

FIG. 3 shows the present device in use by a swimmer.

DETAILED DESCRIPTION OF THE PRESENT INVENTION

One embodiment of the waterproof headband 10 of the present invention is illustrated in FIG. 1. The headband 10 is suitable for wearing about the user's head 11 as hereinafter described. The headband 10 includes a radio receiver or cassette player hereinafter referred to as amplifier 12 including suitable circuit boards which may be of a conventional structure. The unit 10 includes at least one, preferably a pair of headphones 13 and 14 which are spaced from the amplifier 12 in such a manner that the earphones overlie the user's ears during operation while the circuit board may be located otherwise such as at the front or rear of the user's head.

The amplifier 12 may be of any conventional design and is therefore not shown in detail schematic. One preferred unit is available from Toshiba Corporation under the designation FM Stereo Receiver RP-30. Such receiver has a frequency range of FM 88–108 MHz, operates on 1.5 DC volts and has a power output of 10 mW. This receiver also has a 32 ohms mini jack for stereo headphones. The earphones may be connected using the jack. Alternatively, the earphones may be wired direct. The dimensions of this receiver is $31 \times 59 \times 13.5$ mm.

The amplifier 12 may be controlled by an on/off switch 16 which may be a compressible button which when it is first depressed switches the sound generating circuitry boards on. When the switch 16 is depressed a second time, the amplifier is switched off. The amplifier may further include a radio frequency control 17 which may be rotated to adjust the frequency being received. The device 10 may have a volume control 18 which may be rotated to raise and lower the volume of sound. An antenna 19 is provided in the unit 10. The controls may be alternatively electronic rather than manual. For example, a remote tuner may be used thereby having all elements of the headband covered by the elastomer. Battery access may be through a screw cap (not shown).

The earphones 13 and 14 may be of conventional design and are suitably interconnected to the amplifier 12 such as by the wires 21 and 22.

The entire system, with the exception of the external portions of the two controls 17 and 18, may be sealed within the elastomeric headband 23 in such a manner that the entire unit is waterproof. Any suitable elastomer may be used so long as the elastomer is resistant to water, providing a waterproof enclosure for the amplifier and earphones and so long as the necessary elasticity is present. The elasticity permits stretching the band over the user's head and holds the band in place during use. One suitable elastomer is thermoplastic polyurethane resin such as Texin-913 sold by Mobay Chemical Corporation. The band may be inflated with sufficient air to provide floatability. The inflation may be adjusted to provide sizing thereby fitting various head sizes.

While a preferred embodiment of the present invention is shown in FIGS. 1–3, it is to be recognized that various modifications may be made. For example, the devices of the present invention may be provided in a monophonic embodiment having either one or two earphones. Moreover, the present invention may be provided as a cassette or tape playing device rather than a stereophonic radio. The tape may be built into the unit and may for example play a two hour symphony recording. Further, the headband may include a heart monitor and/or a lap counter.

We claim:

1. A waterproof sound amplifier headband comprising amplifier circuitry and at least one earphone, said circuitry and earpone being sealed in an inflatable waterproof jacket, said jacket comprising a unitary elastomeric band, said band being adapted to snuggly engage a user's head with said circuitry being disposed adjacent to the said user's head and said earphones being disposed adjacent to said user's ears.

2. The sound amplifier headband of claim 1, wherein said headband is sized by the amount of inflation and floats in water.

3. The headband of claim 2, wherein said circuitry is encased within a housing and wherein said housing comprises a portion of said waterproof jacket.

4. The waterproof headband of claim 3, wherein said housing comprises an elastomeric encasement.

5. The waterproof headband of claim 2, wherein said amplifier comprises a radio receiver.

6. The waterproof headband of claim 2, wherein said amplifier comprises a radio receiver having at least one control which may be manipulated by depressing said control while said control lies beneath the surface of said elastomeric encasement.

7. The waterproof headband of claim 4, wherein said amplifier comprises a radio receiver having at least one control with a rotatable shaft, said rotatable shaft extending through said elastomeric encasement, whereby said control may be manipulated from outside said encasement.

8. A radio set comprising a housing and a radio receiver, said receiver being disposed in said housing, said housing providing a water tight seal for said receiver, earphones associated with said receiver, said earphones being adapted to overlie a user's ears to transmit sound into said ears from radio reception, a water tight elastomeric inflatable head band for securing said housing, receiver and earphones on the user's head, said headband serving to encase at least said earphones, said headband being floatable in water.

9. The radio set of claim 8, wherein said set is remote controlled.

10. A watersport radio set comprising a radio receiver and at least one earphone, said radio receiver and said earphone being encased in a unitary elastomeric inflatable band, said elastomeric band being sized to snuggly surround a swimmers head, said earphone being located in said band such that the receiver is carried adjacent to the swimmer's head, said earphone being positioned adjacent the user's ear during use.

* * * * *